(12) United States Patent
Kao

(10) Patent No.: US 8,270,159 B2
(45) Date of Patent: Sep. 18, 2012

(54) PORTABLE ELECTRONIC DEVICE CAPABLE OF CONTAINING ELECTRONIC PAPER

(75) Inventor: Kung-Ming Kao, Taipei (TW)

(73) Assignee: Inventec Appliances Corp., Wugu Dist., New Taipei (TW)

( * ) Notice: Subject to any disclaimer, the term of this patent is extended or adjusted under 35 U.S.C. 154(b) by 275 days.

(21) Appl. No.: 12/850,625

(22) Filed: Aug. 4, 2010

(65) Prior Publication Data
US 2011/0080694 A1   Apr. 7, 2011

(30) Foreign Application Priority Data
Oct. 2, 2009 (TW) .............................. 98133531 A

(51) Int. Cl.
*H05K 5/02* (2006.01)
*H04M 1/03* (2006.01)

(52) U.S. Cl. .................. 361/679.56; 345/169; 455/90.3; 455/575.1

(58) Field of Classification Search .......... 361/679.01, 361/679.56; 345/169; 455/90.3, 575.1
See application file for complete search history.

(56) References Cited

U.S. PATENT DOCUMENTS

| | | | | |
|---|---|---|---|---|
| 6,311,076 B1* | 10/2001 | Peuhu et al. | | 455/566 |
| 6,940,497 B2* | 9/2005 | Vincent et al. | | 345/204 |
| 7,558,057 B1* | 7/2009 | Naksen et al. | | 361/679.56 |
| 7,639,237 B2* | 12/2009 | Perkins | | 345/168 |
| 7,667,962 B2* | 2/2010 | Mullen | | 361/679.56 |
| 7,786,951 B2* | 8/2010 | Huitema et al. | | 345/1.2 |
| 8,064,962 B2* | 11/2011 | Wilcox et al. | | 455/566 |
| 2002/0090980 A1* | 7/2002 | Wilcox et al. | | 455/566 |
| 2006/0034039 A1* | 2/2006 | Van Rens | | 361/681 |
| 2006/0166713 A1* | 7/2006 | Yeh et al. | | 455/575.1 |
| 2008/0068292 A1* | 3/2008 | Yuan et al. | | 345/2.1 |
| 2008/0247126 A1* | 10/2008 | Otsuka et al. | | 361/681 |
| 2009/0073084 A1* | 3/2009 | Mullen | | 345/8 |
| 2010/0182738 A1* | 7/2010 | Visser et al. | | 361/679.01 |
| 2010/0246113 A1* | 9/2010 | Visser et al. | | 361/679.3 |
| 2011/0018820 A1* | 1/2011 | Huitema et al. | | 345/173 |
| 2011/0043479 A1* | 2/2011 | van Aerle et al. | | 345/174 |
| 2012/0050075 A1* | 3/2012 | Salmon | | 341/20 |

FOREIGN PATENT DOCUMENTS
JP   2004279774 A   * 10/2004

* cited by examiner

Primary Examiner — Robert J Hoffberg
(74) Attorney, Agent, or Firm — Winston Hsu; Scott Margo

(57) ABSTRACT

A portable electronic device includes an electronic paper, a case, a guiding mechanism, an assembling mechanism, a mobile communication module, a first support structure and a second support structure. The guiding mechanism is disposed in the case to form a guiding space. The assembling mechanism is disposed in the guiding mechanism. The assembling mechanism includes a flexible connecting part and a driving part. The driving part is connected to the electronic paper and the flexible connecting part for rolling the flexible connecting part to contain the electronic paper in the guiding space. The first and second support structures are pivoted to two ends of the case respectively and form a support rail. A connecting socket on the first support structure is electrically connected to the mobile communication module. The electronic paper moves along the support rail to connect to the connecting socket upon the stretching state.

10 Claims, 5 Drawing Sheets

PORTABLE ELECTRONIC DEVICE CAPABLE OF CONTAINING ELECTRONIC PAPER

BACKGROUND OF THE INVENTION

1. Field of the Invention

The present invention relates to a portable electronic device, and more particularly, to a portable electronic device capable of containing electronic paper.

2. Description of the Prior Art

Paper is generally used as the important media of writing and reading due to its flexibility and portability. However, manufacture of conventional paper consumes lots of natural resources, and further the conventional paper is not able to be written over and over again. Therefore, there is an electronic paper coming out. The basic principle of the electronic paper is to use microcapsule technology to wrap electrophoretic liquid as well as suspended pixel particles into nano-sized microcapsules so as to form electronic ink. In other words, each of the microcapsules includes white positively-charged particles and black negatively-charged particles suspended in the clear liquid. When a negatively-charged electrical field is applied to the top side of the microcapsule, the said white particles move upward. Meanwhile, there is a positively-charged electrical field applied to the bottom side of the microcapsule such that the said black particles move downward. In such a manner, the microcapsule shows white color. On the other hand, when the said electrical fields are reversely applied to the microcapsule, the microcapsule shows black color. Accordingly, via the said control of the electrical fields mentioned above, the specifically-arranged microcapsules may show black-white images cooperatively.

As known above, since the electronic paper has the following advantages of a large screen, repeatable use and having an ability to update display information via the aforementioned microcapsule technology and, furthermore, the related manufacture technology is getting more and more mature, it is generally applied to one's daily life. However, because the softness of the electronic paper still can not achieve the same level as paper, inconvenience of storage is a great disadvantage of the electronic paper in use. Besides, in the aspect of updating display information, with the development of wireless communication technology, a common method is to utilize an advanced communication system (e.g. 3G, 3.5G) for message download. But due to the disability to simultaneously utilize its advanced communication system for wireless communication, in the aspect of mechanical design of the electronic paper in prior art, it may commonly request a user to set up an extra mobile phone. As a result, it will cause increase of cost for a user as well as inconvenience of use.

In summary, how to integrate a mobile phone with an electronic paper to solve the problem of inconvenience of storing the electronic paper and request for an extra mobile phone is one of the important issues in the structural design of the electronic paper.

SUMMARY OF THE INVENTION

The present invention provides a portable electronic device for containing electronic paper. The portable electronic device comprises an electronic paper, a case, a guiding mechanism, an assembling mechanism, a mobile communication module, a first support structure and a second support structure. The guiding mechanism is disposed inside the case, wherein a guiding space is formed in the guiding mechanism for providing the electronic paper to move upon a stretching state or a non-stretching state. The assembling mechanism is disposed in the guiding space and comprises a flexible connecting part connected to the electronic paper and a driving part disposed in the guiding space and connected to the flexible connecting part. The driving part is used for rolling the flexile connecting part so as to drive the electronic paper to be contained in the guiding space. The mobile communication module is disposed over the case and electrically connected to the driving part. The mobile communication module is used for controlling display of the electronic paper and operation of the driving part. The first support structure is pivotally connected to one end of the case and has a connecting socket. The connecting socket is electrically connected to the mobile communication module. The second support structure is pivotally connected to another end of the case. The second support structure and the first support structure cooperatively form a support rail. The electronic paper moves along the support rail to be connected to the connecting socket upon the stretching state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
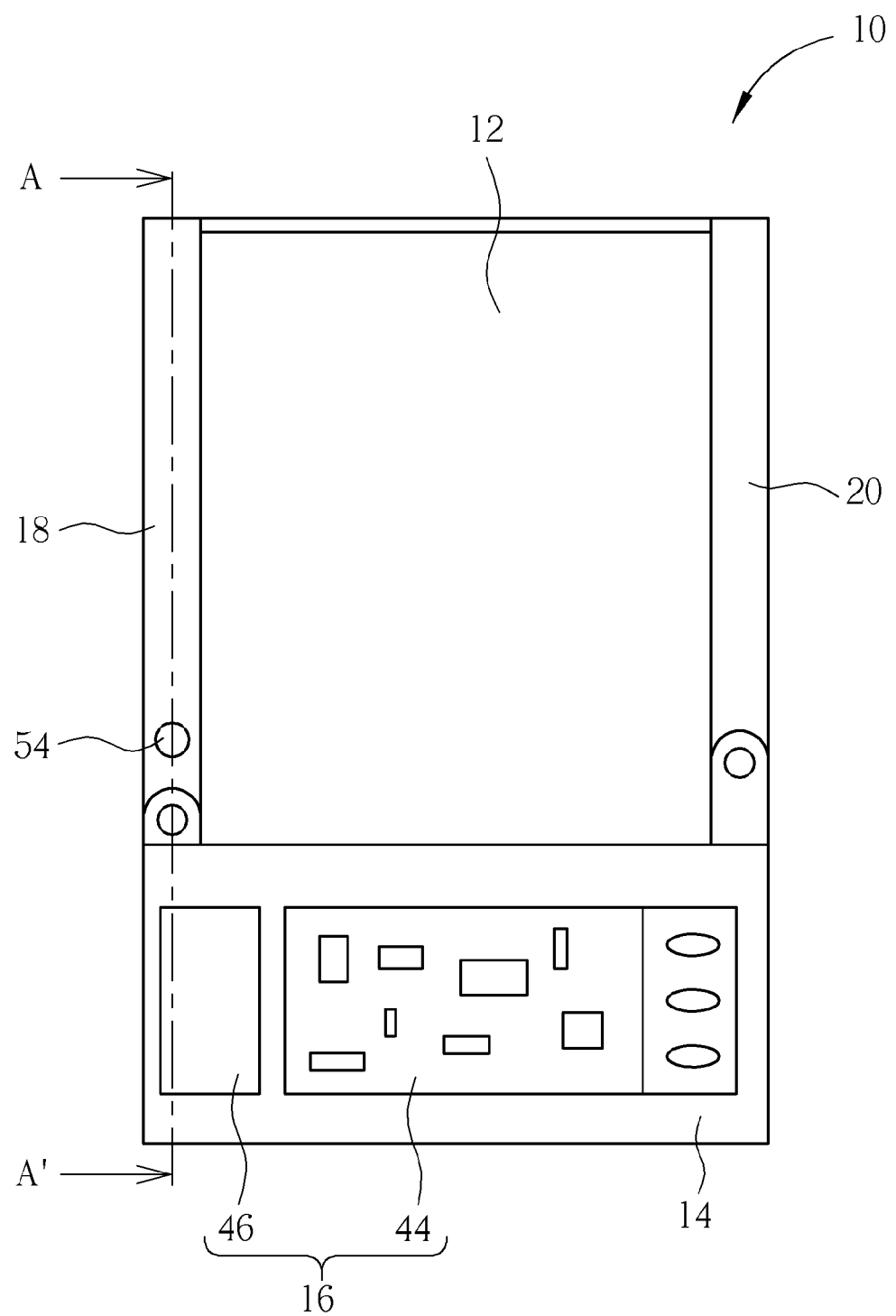
FIG. 1 is a top view of a portable electronic device according to a preferred embodiment of the present invention.

Please refer to FIG. 1, which is a top view of a portable electronic device 10 according to a preferred embodiment of the present invention. As show in FIG. 1, the portable electronic device 10 includes an electronic paper 12, a case 14, a mobile communication module 16, a first support structure 18, and a second support structure 20. The mobile communication module 16 is disposed over the case 14 for controlling display of the electronic paper 12 and wireless communication. The mobile communication module 16 can be a common wireless communication device, such as a mobile phone or a mobile internet device (MID) and so on. The first support structure 18 and the second support structure 20 are pivotally connected to both ends of the case 14, respectively.

Figure 2:
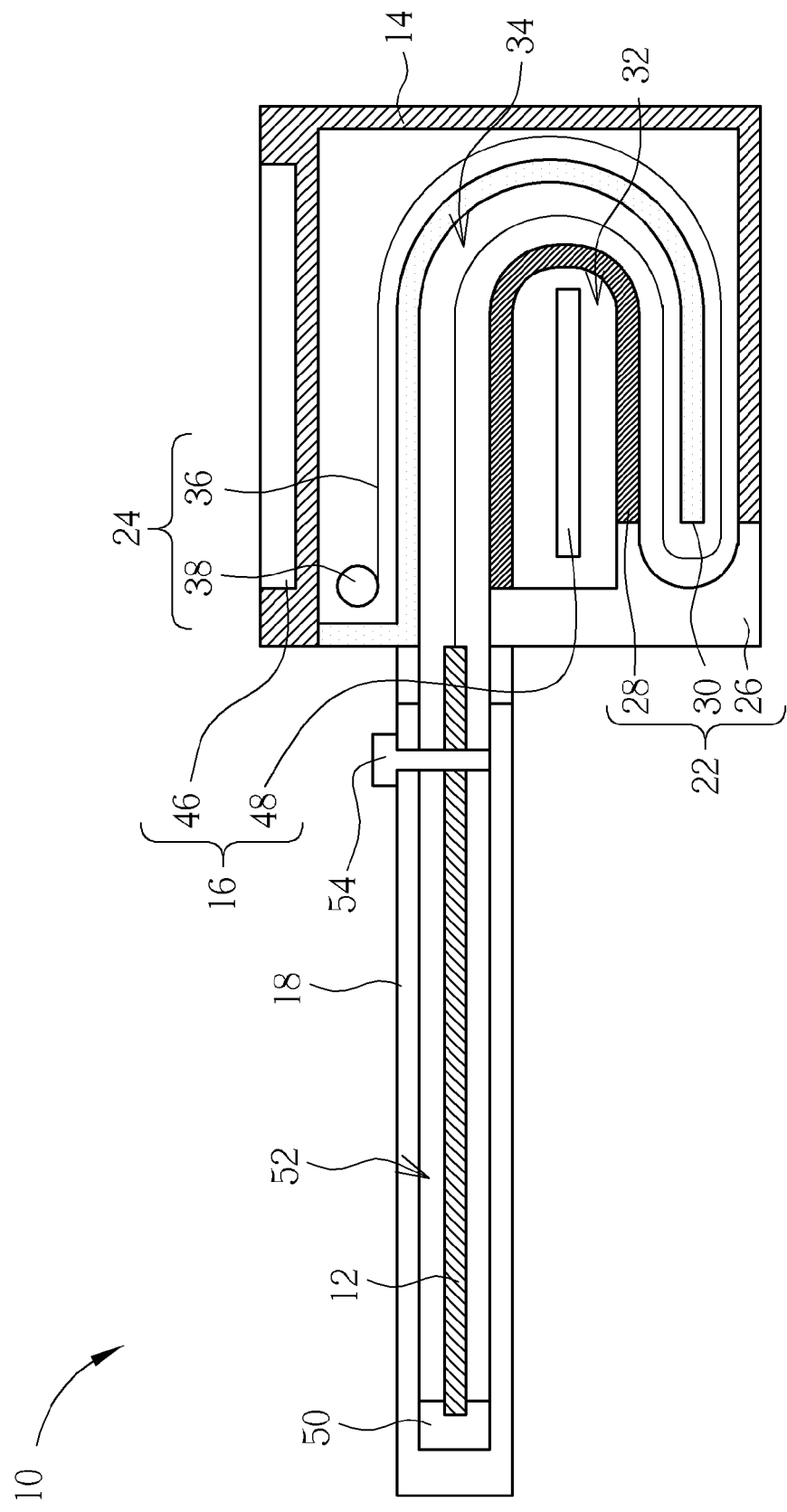
FIG. 2 is a section diagram of the portable electronic device shown in FIG. 1 along A-A' section line.

Please refer to FIG. 2, which is a section diagram of the portable electronic device 10 shown in FIG. 1 along A-A' section line. As known in FIG. 2, the portable electronic device 10 further includes a guiding mechanism 22 and an assembling mechanism 24. The guiding mechanism 22 is disposed inside the case 14 and includes a side cover 26, a first bending structure 28 and a second bending structure 30. The side cover 26 is connected to the case 14. The first bending structure 28 is connected to the side cover 26 and forms a containing space 32 with the side cover 26 cooperatively. The second bending structure 30 is also connected to the case 14. As known in FIG. 2, the first bending structure 28 and the second bending structure 30 are a U-shaped structure, respectively. Thus, the first bending structure 28, the second bending structure 30, the side cover 26 and the case 14 can cooperatively form a guiding space 34. The assembling mechanism 24 is disposed in the guiding mechanism 22 and includes a flexible connecting part 36 and a driving part 38. The flexible connecting part 36 is connected to the electronic paper 12. The related connecting method may be commonly seen in the prior art. As for which method is utilized, it depends on the manufacturing needs of the assembling mechanism 24. For example, please refer to FIG. 3, which is an enlarged diagram of the flexible connecting part 36 being connected to the electronic paper 12 according to a preferred embodiment of the present invention. As known in FIG. 3, a connecting structure 40 is formed at one end of the electronic paper 12 and a connecting hole 42 is formed on the flexible connecting part 36. The connecting structure 40 is, for example, a T-shaped engaging part and passes through the connecting hole 42 such that the flexible connecting part 36 can be connected to the electronic paper 12. In other embodiment, the connecting part 40 may be engaged with or attached to the flexible connecting part 36 instead. The driving part 38 is disposed in the guiding space 34 and is connected to the flexible connecting part 36. The driving part 38 is used for rolling the flexible connecting part 36 so as to drive the electronic paper 12 to be contained in the guiding space 34. In this embodiment, the driving part 38 is preferably an electric shaft.

Then, as known in FIG. 1 and FIG. 2, the mobile communication module 16 includes a user interface 44, a display unit 46 and a control circuit board 48. The user interface 44 and the display unit 46 are both disposed on the case 14. The user interface 44 and the display unit 46 are preferably an operation device and a display device on a conventional mobile phone, respectively. For example, the user interface 44 may be a button or a touch panel on a mobile phone, while the display unit 46 may be a liquid crystal display (LCD) on the mobile phone. As for the control circuit board 48, it includes some common electronic parts installed in a mobile phone (e.g. a flexible circuit board, a battery, etc.), and the related description may be therefore omitted herein for simplicity. As shown in FIG. 2, the control circuit board 48 is disposed in the containing space 32 formed by the side cover 26 cooperatively with the first bending structure 28 and is electrically connected to the user interface 44 and the display unit 46. The control circuit board 48 is used for performing wireless communication of the mobile communication module 16 and control of the display unit 46 according to operation of the user interface 44. Besides, the driving part 38 mentioned above can be electrically connected to the control circuit board 48. Thus, the control circuit board 48 can also be used for controlling operation of the driving part 38. Furthermore, as shown in FIG. 2, the first support structure 18 has a connecting socket 50. The connecting socket 50 can be electrically connected to the control circuit board 48 by inner cable routing of the first support structure 18.

Figure 4:
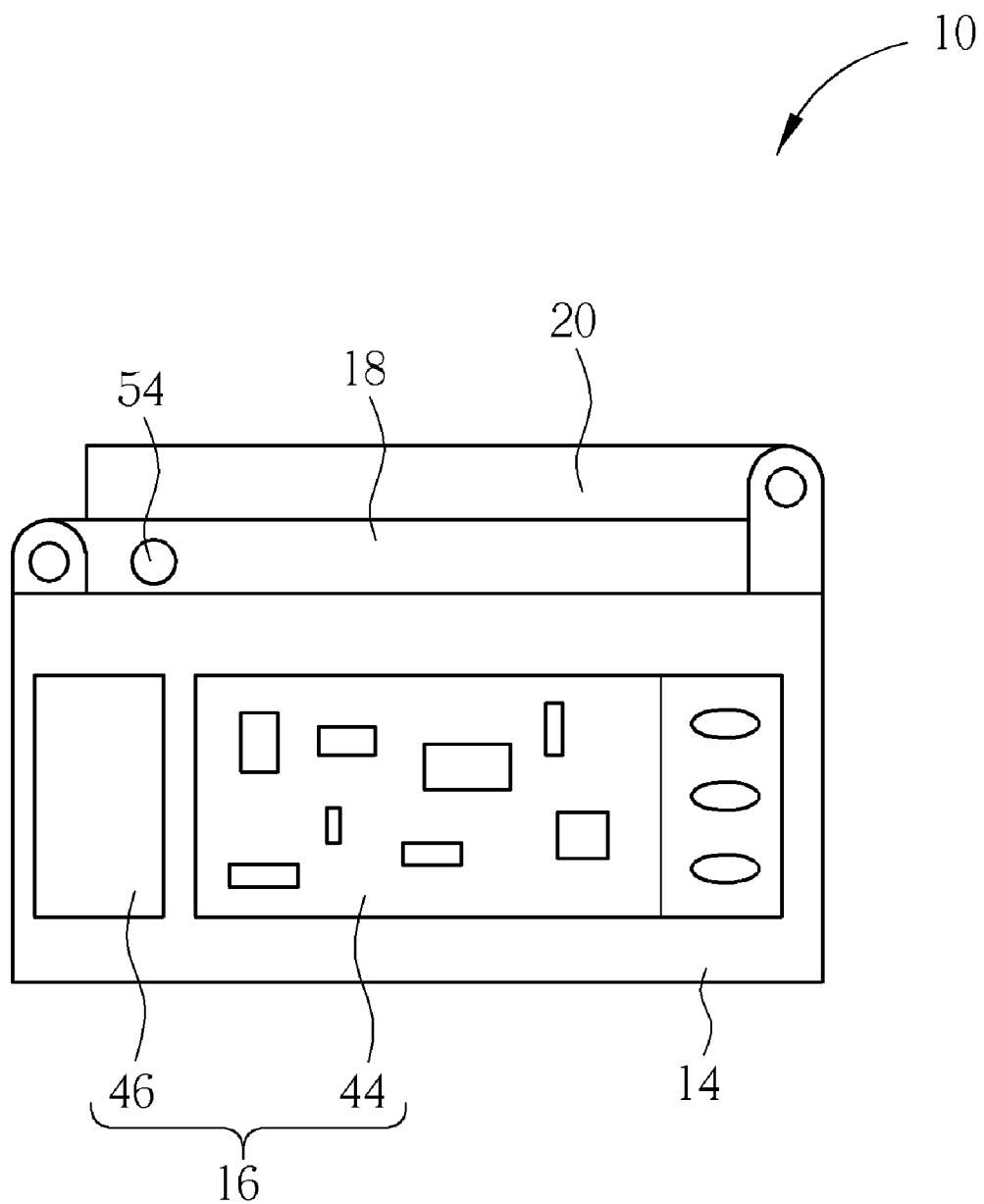
FIG. 4 is a top view illustrating a first support structure and a second structure folded on one side of a case shown in FIG. 1.
Figure 5:
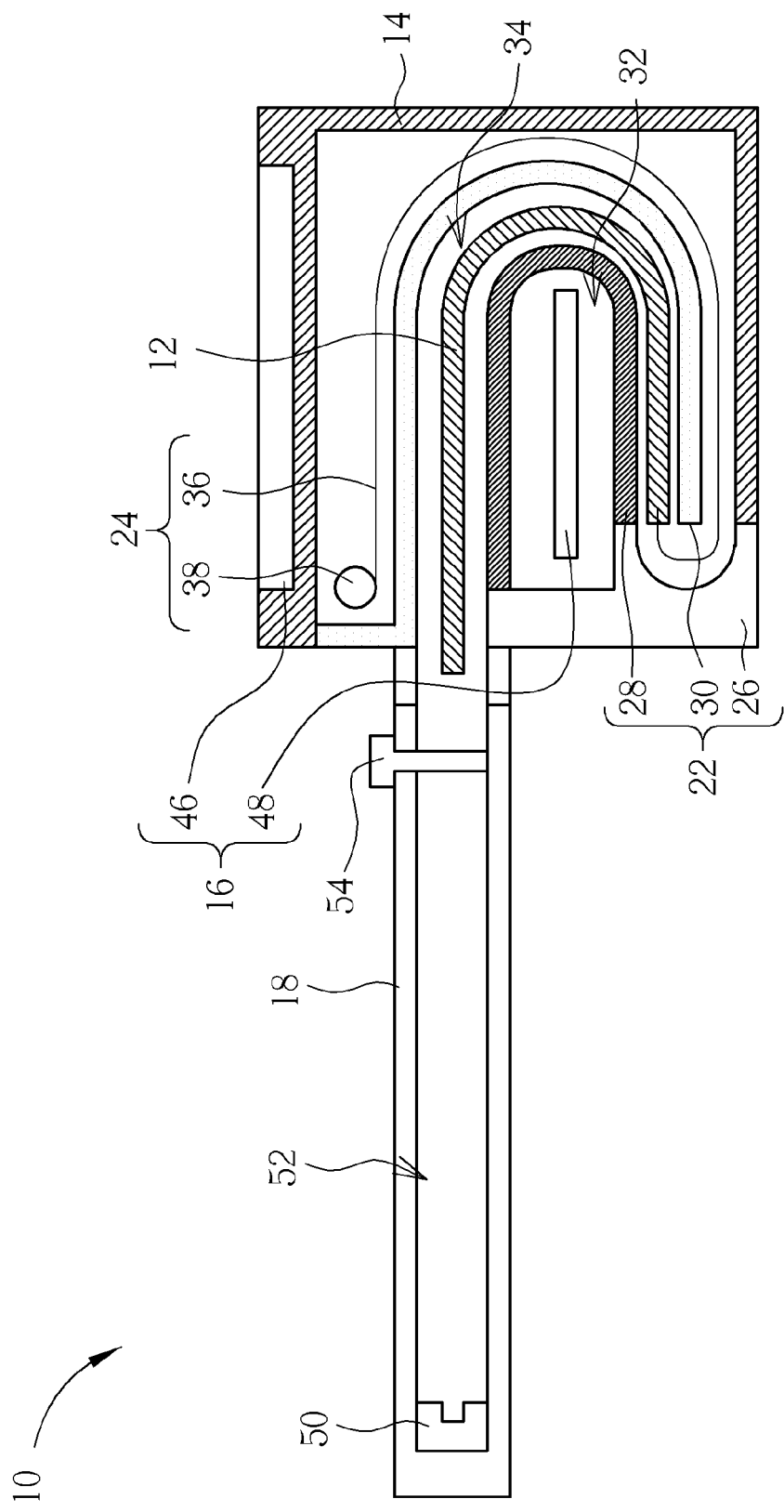
FIG. 5 is a section diagram illustrating the electronic paper contained in a guiding space shown in FIG. 2.

The following description illustrates operation of the portable electronic device 10 in detail. Please refer to FIG. 1, FIG. 2, FIG. 4 and FIG. 5. FIG. 4 is a top view illustrating the first support structure 18 and the second support structure 20 folded on one side of the case 14 shown in FIG. 1. FIG. 5 is a section diagram illustrating the electronic paper 12 contained in the guiding space 34 shown in FIG. 2. As known in FIG. 4 and FIG. 5, when the electronic paper 12 is contained in the guiding space 34 and the first support structure 18 and the second support structure 20 are in a folded state (i.e. the first support structure 18 and the second support structure 20 are folded on one side of the case 14), a user can use the portable electronic device 10 as a general mobile communication device, such as using the user interface 44 for dialing or using the display unit 46 for reading message. The portable electronic device 10 has a smaller size in this condition. When the user wants to use the electronic paper 12 contained in the guiding space 34 to read information or zoom in images displayed on the display unit 46, the user can drag the second support structure 20 and the first support structure 18 in sequence such that the first support structure 18 and the second support structure 20 can rotate from the folded state as shown in FIG. 4 to an expanded state as shown in FIG. 1. After dragging the second support structure 20 and the first support structure 18 to be in the expanded state as shown in FIG. 1, the user can pull out the electronic paper 12 from the guiding space 34 in the guiding mechanism 22 such that the electronic paper 12 can move along a support rail 52 formed by the first support structure 18 cooperatively with the second support structure 20. When the electronic paper 12 is pulled to be connected to the connecting socket 50 (at this time, the electronic paper 12 is in a stretching state as shown in FIG. 2), the electronic paper 12 is positioned accordingly. At this time, the portable electronic device 10 has a larger expanded size. In such a condition, the electronic paper 12 can be electrically connected to the control circuit board 48 in the mobile communication module 16 by the connecting socket 50. In other words, the user can control display of the electronic paper 12 by using the user interface 44 on the mobile communication module 16, such as controlling the electronic paper 12 to display digital documents downloaded from internet or images displayed on the display unit 46. Therefore, the portable electronic device 10 can generate a greater display than that of the display unit 46 on the mobile communication module 16 by using the design that the electronic paper 12 is extended from one side of the case 14, whereby it can solve the problem of the display unit 46 on the mobile communication module 16 being undersized for the user in reading. Furthermore, it provides the user a clearer and more comfortable vision quality. Besides, except for the above-mentioned electrical connection by the connecting socket 50, signal transmission between the electronic paper 12 and the mobile communication module 16 can also be performed wirelessly, so as to omit disposal of the connecting socket 50.

Next, when the user wants to operate the extended electronic paper 12 to be contained in the portable electronic device 10, the user shall only press a specific function key (hardware) provided on the user interface 44 or use a control program (software) installed in the mobile communication module 16, whereby the control circuit board 48 will be driven to activate the driving part 38. As known above, in this embodiment, the driving part 38 can preferably be an electric shaft. In other words, when the control circuit board 48 activates the driving part 38, the driving part 38 may start to roll the flexible connecting part 36, and further drive the electronic paper 12 which is connected to the flexible connecting part 36 so as to disengage from the connecting socket 50. Subsequently, the flexible connecting part 36 moves along the support rail 52 into the guiding space 34. After the electronic paper 12 is completely contained in the guiding space 34 (at this time, the electronic paper 12 is in a non-stretching state as shown in FIG. 5), the control circuit board 48 can control the driving part 38 to stop rolling the flexible connecting part 36. As for the related control method, it may involve utilizing a step control technology or outputting a corresponding control signal to stop rolling of the driving part 38 when detecting that the electronic paper 12 enters or leaves a specific zone. Subsequently, the user just needs to rotate the first support structure 18 and the second support structure 20 in sequence from the expanded state as shown in FIG. 1 to the folded state as shown in FIG. 4, so as to complete containing of the electronic paper 12. Accordingly, the portable electronic device 10 can return to a folded state shown in FIG. 4 so as to enhance its portability.

Figure 3:
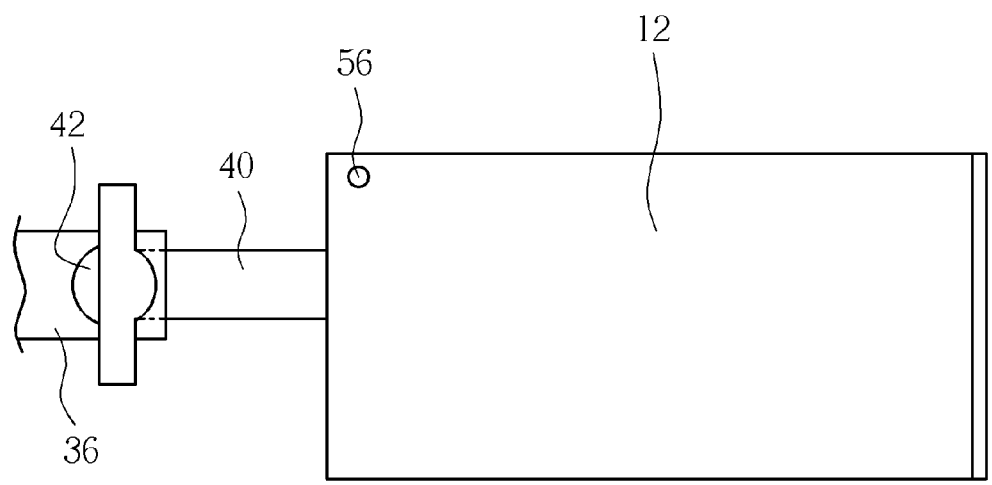
FIG. 3 is an enlarged diagram of a flexible connecting part being connected to an electronic paper according to a preferred embodiment of the present invention.

It should be noticed that the portable electronic device 10 as shown in FIG. 2 and FIG. 3 further includes a fixing part 54 and a fixing hole 56 is formed on the electronic paper 12. Accordingly, the fixing part 54 is used for being inserted into the fixing hole 56 so as to fix the electronic paper 12 on the support rail 52 when the electronic paper 12 is connected to the connecting socket 50. The fixing part 54 and the fixing hole 56 mentioned above may be an omissible part to simplify the structure design of the portable electronic device 10. Furthermore, the rail design of the guiding mechanism 22 can not be limited to the aforesaid embodiment and can be modified according to a length of the electronic paper 12. For example, it can increase or decrease the length of the guiding space 34 by modifying the number and the location of the bending structure mentioned in the above embodiment as well as by assembly of the case 14 and the side cover 26, so as to enhance the flexibility of the portable electronic device 10 in use.

In summary, the present invention is to provide a combination of the guiding mechanism, the assembling mechanism and the support mechanism such that the electronic paper can be integrated with the mobile communication module in a case. In such a manner, when the electronic paper is contained in the guiding space of the guiding mechanism, a user can use the portable electronic device as a portable communication module. On the other hand, when the electronic paper is extended from one side of the case by the support mechanism, the user can utilize the user interface on the mobile communication module to control display of the electronic paper such that reading digital documents downloaded by the wireless communication function of the mobile communication module or viewing images displayed on the display unit can be achieved. In other words, the portable electronic device of the present invention not only solves the problem of inconvenience of storing the electronic paper by using the assembling mechanism and the guiding mechanism, but also solves an undersized display issue of the mobile communication module in the prior art by using the large-sized display characteristic of the electronic paper. Furthermore, since power consumption of the electronic paper is less than that of the display unit (i.e. a liquid crystal display) on the mobile communication module, it can enhance a standby time of the mobile communication module. Moreover, the font and format of a text shown on the electronic paper can be adjusted by the operating system in the mobile communication system, so as to provide the user a clearer and more comfortable vision quality.

Those skilled in the art will readily observe that numerous modifications and alterations of the device and method may be made while retaining the teachings of the invention.

What is claimed is:

1. A portable electronic device for containing electronic paper, the portable electronic device comprising:
   the electronic paper for displaying information;
   a case;
   a guiding mechanism, disposed inside the case, wherein a guiding space is formed in the guiding mechanism for providing the electronic paper to move upon a stretching state or a non-stretching state;
   an assembling mechanism, disposed in the guiding space and comprising:
      a flexible connecting part, connected to the electronic paper; and
      a driving part, disposed in the guiding space and connected to the flexible connecting part, the driving part being used for rolling the flexile connecting part so as to drive the electronic paper to be contained in the guiding space;
   a mobile communication module, disposed over the case and electrically connected to the driving part, the mobile communication module being used for controlling display of the electronic paper and operation of the driving part;
   a first support structure, pivotally connected to one end of the case and having a connecting socket, the connecting socket being electrically connected to the mobile communication module; and
   a second support structure, pivotally connected to another end of the case, the second support structure and the first support structure cooperatively forming a support rail, wherein the electronic paper moves along the support rail to be connected to the connecting socket upon the stretching state.

2. The portable electronic device of claim 1, wherein the guiding mechanism comprises:
   a side cover, connected to the case;
   a first bending structure, connected to the side cover and forming a containing space cooperatively with the side cover; and
   a second bending structure, connected to the case, wherein the guiding space is formed by the first bending structure, the second bending structure, the side cover and the case.

3. The portable electronic device of claim 2, wherein the first bending structure and the second bending structure are a U-shaped bending structure, respectively.

4. The portable electronic device of claim 2, wherein the mobile communication module comprises:
   a user interface, disposed over the case;
   a display unit, disposed over the case; and
   a control circuit board, disposed in the containing space and electrically connected to the user interface and the display unit, the control circuit board being used for performing wireless communication and controlling display of the display unit according to operation of the user interface.

5. The portable electronic device of claim 4, wherein the user interface is a button.

6. The portable electronic device of claim 4, wherein the display unit is a liquid crystal display.

7. The portable electronic device of claim 1 further comprising a fixing part, a fixing hole being formed on the electronic paper, the fixing part being used for inserting into the fixing hole when the electronic paper is connected to the connecting socket, so as to fix the electronic paper onto the support rail.

8. The portable electronic device of claim 1, wherein a connecting structure is formed at one end of the electronic paper, a connecting hole is formed on the flexible connecting part, and the connecting structure is used for engaging with the connecting hole.

9. The portable electronic device of claim 8, wherein the connecting structure is a T-shaped connecting part.

10. The portable electronic device of claim 1, wherein the driving part is an electric shaft.

* * * * *